United States Patent
Gupta

(10) Patent No.: US 10,746,641 B2
(45) Date of Patent: Aug. 18, 2020

(54) PEEL BENDING MOMENT CALCULATION

(71) Applicant: Honda Motor Co., Ltd., Tokyo (JP)

(72) Inventor: Sameer Gupta, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 649 days.

(21) Appl. No.: 15/468,984

(22) Filed: Mar. 24, 2017

(65) Prior Publication Data

US 2018/0275032 A1  Sep. 27, 2018

(51) Int. Cl.
| | |
|---|---|
| *G01N 3/20* | (2006.01) |
| *B23K 31/12* | (2006.01) |
| *G01N 19/04* | (2006.01) |
| *B23K 101/00* | (2006.01) |

(52) U.S. Cl.
CPC .............. *G01N 3/20* (2013.01); *B23K 31/12* (2013.01); *B23K 31/125* (2013.01); *G01N 19/04* (2013.01); *B23K 2101/006* (2018.08); *G01N 2203/0026* (2013.01); *G01N 2203/0067* (2013.01); *G01N 2203/0091* (2013.01)

(58) Field of Classification Search
None
See application file for complete search history.

(56) References Cited

U.S. PATENT DOCUMENTS

| | | | |
|---|---|---|---|
| 5,050,089 A * | 9/1991 | Stelson | B21D 7/14 700/165 |
| 6,186,011 B1 | 2/2001 | Wung et al. | |
| 9,193,010 B2 | 11/2015 | Miyazaki et al. | |
| 2009/0211366 A1* | 8/2009 | Tomioka | G01N 3/00 73/841 |
| 2011/0111220 A1* | 5/2011 | Takarada | C09J 7/385 428/345 |

(Continued)

FOREIGN PATENT DOCUMENTS

| | | |
|---|---|---|
| CN | 102778403 | 11/2012 |
| CN | 204556212 | 8/2015 |

(Continued)

OTHER PUBLICATIONS

Cavalli, M. N.; Thou Less, M. D.; Yang, Q. D. (2005). "Cohesive-zone modelling of the deformation and fracture of spot-welded joints." Fatigue & Fracture of Engineering Materials & Structures 28(10): 861-874 (Year: 2005).*

(Continued)

*Primary Examiner* — Lina M Cordero
(74) *Attorney, Agent, or Firm* — Rankin, Hill & Clark LLP

(57) ABSTRACT

Methods to accurately determine the maximum bending moment Mb for a spot weld are provided. The methods include subjecting a test coupon including a spot weld, to a coach peel test and monitoring the test coupon using digital image correlation in order to determine the bending moment arm length at peak force. The bending moment arm length at peak force is multiplied by the peak force value to provide an accurate maximum bending moment for the spot weld. The calculated maximum bending moment Mb is used in a combined force based spot weld failure calculation to predict failure of a spot weld under a combined loading condition.

19 Claims, 2 Drawing Sheets

(56) References Cited

U.S. PATENT DOCUMENTS

| | | | |
|---|---|---|---|
| 2015/0202708 A1* | 7/2015 | Aoki | B23K 31/125 |
| | | | 348/90 |
| 2015/0246382 A1* | 9/2015 | Shibata | B21D 5/006 |
| | | | 72/380 |
| 2018/0275033 A1* | 9/2018 | Troive | G01N 3/20 |

FOREIGN PATENT DOCUMENTS

| | | | |
|---|---|---|---|
| JP | 2002035986 A | * | 2/2002 |
| JP | 2005315854 A | * | 11/2005 |
| KR | 100940654 | | 2/2010 |
| KR | 101366258 | | 2/2014 |

OTHER PUBLICATIONS

Auto/Steel Partnership; An Investigation of Resistance Welding Performance of Advanced High-Strength Steels (Year: 2006).*
JP 2005315854 A translation (Year: 2005).*
JP 2002035986 A translation (Year: 2002).*
Reynolds et al. "Digital Image Correlation for Determination of Weld and Base Metal Constitutive Behavior" https://app.aws.org/wj/supplement/oct99/Reynolds.pdf, 6 pages.
"Dynamic Strain Measurement of Welded Tensile Specimens Using Digital Image Correlation (Dynamic Behavior of Materials)" http://what-when-how.com/dynamic-behavior-of-materials/dynamic-strain-measurement-of-welded-tensile-specimens-using-digital-image-correlation-dynamic-behavior-of-materials/ (Accessed Dec. 27, 2016), 4 pages.

* cited by examiner

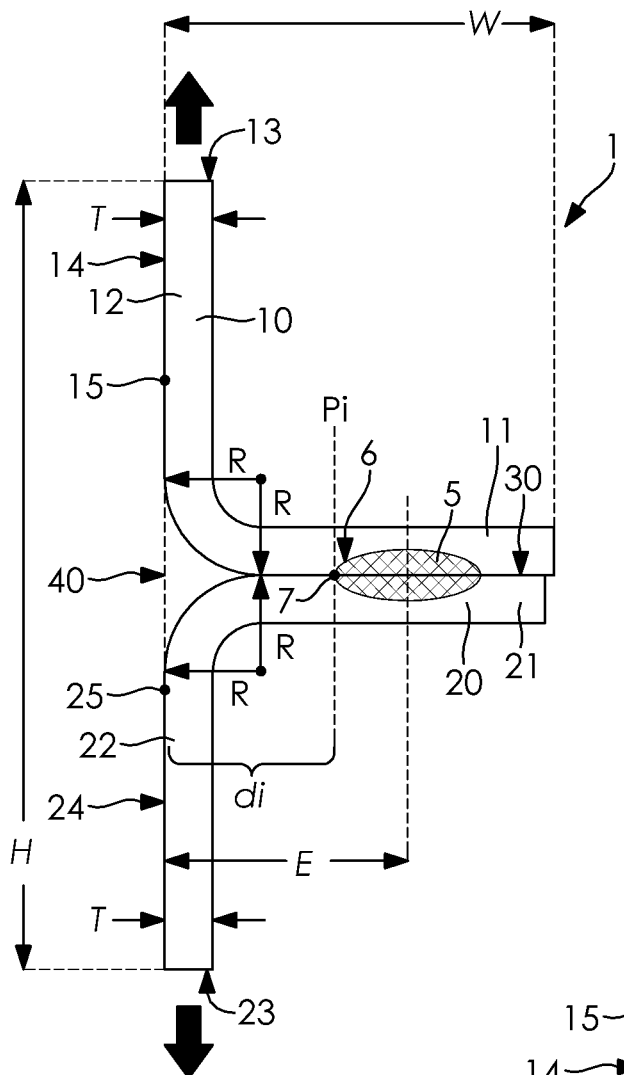
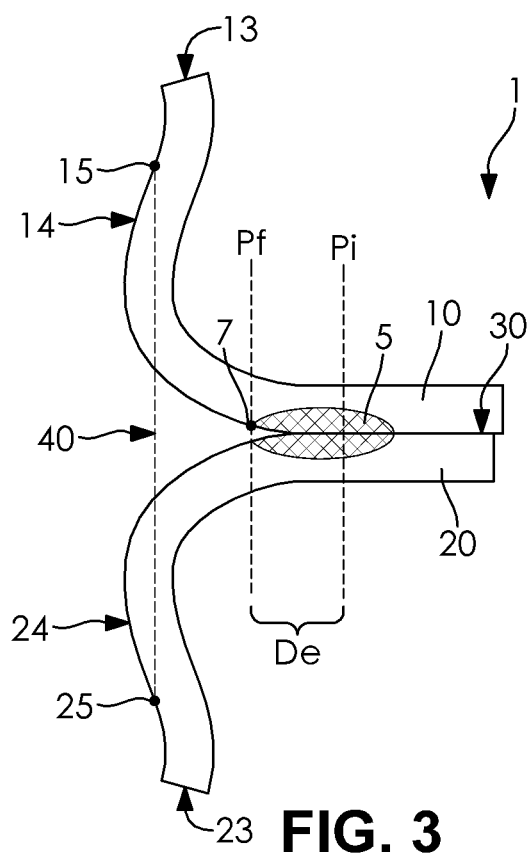
FIG. 2
FIG. 3

PEEL BENDING MOMENT CALCULATION

BACKGROUND

Four types of loadings (i.e. forces) are experienced by a spot weld, namely shear, normal, peel bending, and torsion. For each loading type, there is a different test procedure to determine the individual loading limit at which the spot weld fails. In order to determine the spot weld strength, the test results for each type of loading limit are then input into a combined force based failure calculation formula in order to calculate when various combinations of these different types of loadings will cause the spot weld to fail.

BRIEF DESCRIPTION

According to one aspect, a method for obtaining a maximum bending moment for a spot weld is provided. The method comprises providing a test coupon including a spot weld; subjecting the test coupon to a coach peel test; using digital image correlation (DIC) to determine a bending moment arm length for the test coupon that exists at a time when a peak force is applied to the test coupon during the coach peel test; and multiplying the bending moment arm length by the peak force to thereby calculate the maximum bending moment for the spot weld.

According to another aspect, a method of estimating a strength of a spot weld under a combined loading condition is provided. The method includes determining a shear force limit, a bending moment limit, a normal force limit, and a torsion moment limit of the spot weld. The bending moment limit is determined by, (a) providing a test coupon including a first L-shaped coupon and a second L-shaped coupon each including a first leg and a second leg, the first leg of the first L-shaped coupon is attached by a spot weld to the first leg of the second L-shaped coupon, and the second leg of the first L-shaped coupon is co-planar with the second leg of the second L-shaped coupon; (b) subjecting the test coupon to a coach peel test; (c) using digital image correlation to determine a bending moment arm length for the test coupon that exists at a time when a peak force is applied to the test coupon during the coach peel test; and (d) multiplying the bending moment arm length by the peak force to thereby calculate the bending moment limit for the spot weld.

According to yet another aspect, a method of predicting a failure of a spot weld that is subject to a combined loading condition is provided. The method includes (I) determining a shear force limit, a bending moment limit, a normal force limit, and a torsion moment limit of a spot weld. The bending moment limit is determined by (a) providing a test coupon including a first L-shaped coupon and a second L-shaped coupon each including a first leg and a second leg, the first leg of the first L-shaped coupon is attached by a spot weld to the first leg of the second L-shaped coupon, and the second leg of the first L-shaped coupon is co-planar with the second leg of the second L-shaped coupon; (b) subjecting the test coupon to a coach peel test; (c) using digital image correlation to determine a bending moment arm length for the test coupon that exists at a time when a peak force is applied to the test coupon during the coach peel test; and (d) multiplying the bending moment arm length by the peak force to thereby calculate the bending moment limit for the spot weld. The method also includes (II) simulating a combined loading condition on the spot weld using a spot weld failure model represented by the formula $$\left(\frac{fs}{Fs}\right)^\alpha + \left(\frac{mb}{Mb}\right)^\gamma + \left(\frac{fn}{Fn}\right)^\mu + \left(\frac{mt}{Mt}\right)^\beta = 1$$

wherein Fs is the shear force limit, Mb is the bending moment limit, Fn is the normal force limit, and Mt is the torsion moment limit for the spot weld, wherein fs is the shear force, mb is the bending moment, fn is the normal force, and mt is the torsion moment applied to the spot weld, and wherein $\alpha$, $\gamma$, $\mu$, and $\beta$ are shape parameters of the spot weld. The method also includes (III) based on results from step (II), predicting whether or not the combined loading condition will cause the spot weld to fail.

BRIEF DESCRIPTION OF THE DRAWINGS

FIG. 2 is a cross-sectional view of the test coupon of FIG. 1.

FIG. 3 is a cross-sectional view of the test coupon of FIG. 2 after being subject to a coach peel test.

DETAILED DESCRIPTION

Figure 1:
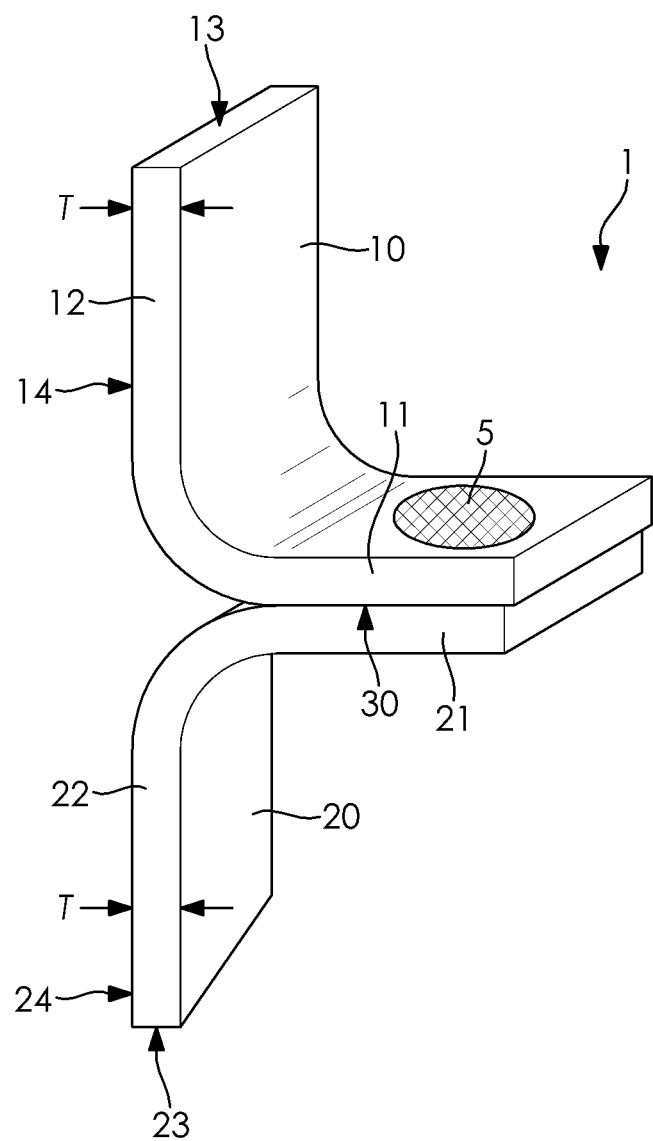
FIG. 1 is a perspective view of a test coupon in accordance with the present subject matter.

Vehicles can typically include thousands of spot welds on the frame members. Accurate estimations of the strength of spot welds and prediction of spot weld failures are useful for vehicle crash test simulations. One variable for determining the strength of a spot weld is the loading limit for the peel bending force, i.e. the maximum bending moment (Mb). This variable is difficult to accurately determine.

In conventional methods of determining the maximum bending moment Mb, it is assumed that an iterative process is used with the aid of Computer Aided Engineering (CAE) simulations. In such processes, a test coupon including a spot weld is likely subject to a conventional coach peel test method in order to measure a maximum force (F) applied to the test coupon during the coach peel test. A maximum bending moment Mb for the spot weld is then calculated by multiplying this measured maximum force F, by the initial measured length of the bending moment arm (d) of the test coupon according to the following Formula I.

$$Mb = F \times d \qquad \text{Formula I}$$

However, this calculated maximum bending moment Mb for the spot weld is typically much larger than expected. In order to correct this large calculated maximum bending moment Mb, a number of different CAE simulation models are run under varying parameters (such as varying bending moment arm lengths d, for example) which produce varying simulated maximum force F values.

The actual measured maximum force F is then matched with a simulated maximum force F having the same value, and by association is then also matched with the simulated maximum bending moment Mb that corresponds to the matched simulated maximum force F. This matched simulated maximum bending moment Mb is different than the calculated maximum bending moment Mb. It is this matched simulated maximum bending moment Mb that may be used—instead of the calculated maximum bending moment Mb—in a combined force based spot weld failure model, This conventional process for determining the maximum bending moment Mb for a spot weld is thus an iterative process that takes time and effort since it requires a number of simulations to be conducted, and does not provide a standard method for making such determinations since matching of the simulated and calculated maximum bending moments Mb is based human judgements.

The present subject matter provides non-iterative methods to accurately determine the maximum bending moment Mb for a spot weld, which can then be used in a combined force based spot weld failure model, such as that shown below in Formula II, which can govern a CAE simulation model for predicting spot weld failure under combined static loadings.

$$\left(\frac{fs}{Fs}\right)^\alpha + \left(\frac{mb}{Mb}\right)^\gamma + \left(\frac{fn}{Fn}\right)^\mu + \left(\frac{mt}{Mt}\right)^\beta = 1 \quad \text{Formula II}$$

In Formula II, the letters s, b, n and t represent the four independent types of forces that can be applied to a spot weld, namely tensile shear, peel bending, normal pull, and in-plane torsion, respectively. The denominators Fs, Mb, Fn and Mt are respectively, the shear force limit, the bending moment limit (i.e. maximum bending moment), the normal force limit, and the torsion moment limit for the spot weld. In other words, they are the loading limits that determine the spot weld strength, and correspond, respectively, to the four independent types of forces. The numerators fs, mb, fn and mt are the simulated independent loads applied to the spot weld, corresponding respectively, to the four independent types of forces. The powers $\alpha$, $\gamma$, $\mu$, and $\beta$ are shape parameters that would define the failure surface between the independent modes.

The present methods of determining the maximum bending moment Mb for a spot weld, include subjecting a test coupon that includes a spot weld to a coach peel test and monitoring movements of the test coupon using digital image correlation (DIC), and more specifically, by monitoring the bending moment arm length during the entire test.

The maximum bending moment Mb for the spot weld is calculated using Formula I, wherein the value of d is the length of the bending moment arm at a point in time when the force F applied to the test coupon during the coach peel test is at a peak value (i.e. just before spot weld failure). The bending moment arm length at peak force is designated herein as "$d_p$".

The bending moment arm length at peak force $d_p$ is determined by subjecting the test coupon to a coach peel test, during which DIC is used to track movements of the test coupon. As described in more detail herein, the length of the bending moment arm at the moment when a peak force is applied to the test coupon can be accurately determined by using DIC. This bending moment arm length at peak force $d_p$ is then multiplied, in accordance with Formula I, by the measured peak force value F to provide an accurate value for the maximum bending moment Mb for the spot weld.

Once the maximum bending moment Mb is accurately determined in this manner, it may then be input into a CAE simulation model that uses a combined force based spot weld failure calculation according to Formula II, in order to predict the failure of a spot weld that is subject to a combined loading condition.

The methods disclosed herein eliminate the iterative and non-standard processes that may be conventionally used in simulations for determining the peel bending moment Mb.

Referring now to FIGS. 1-3, there is shown a coach peel test coupon 1 that may be used in the instant methods for determining the maximum bending moment Mb of a spot weld 5. The test coupon 1 includes a first L-shaped coupon 10 and a second L-shaped coupon 20, each of which includes a first leg 11, 21 respectively, and a second leg 12, 22 respectively. The first leg 11 of the first L-shaped coupon 10 is connected to the first leg 21 of the second L-shaped coupon 20 by the spot weld 5, thereby defining a welded interface 30 between the first L-shaped coupon 10 and the second L-shaped coupon 20. In several embodiments, the second leg 12 of the first L-shaped coupon 10 is substantially co-planar with the second leg 22 of the second L-shaped coupon 20, and the second legs 12, 22 each have an outer surface 14, 24 respectively, that faces away from the spot weld 5.

In several embodiments, during the coach peel test, the first L-shaped coupon 10 is constrained at a distal end 13 of the second leg 12 (e.g. by using an Instron® test machine hydraulic grip), while the second L-shaped coupon 20 is held hydraulically at a distal end 23 of the second leg 22. The distal ends 13, 23 of each of the two L-shaped coupons may be held by clamps, for example.

The second leg 22 of the second L-shaped coupon 20 may be held stationary, while the second leg 12 of the first L-shaped coupon 10 may be pulled in a direction perpendicular to the welded interface 30 (i.e. pulled up in the figures, herein referred to as "the y-axis direction") as indicated by the up arrow in FIG. 2, such that the first and second L-shaped coupons are peeled away from each other until the spot weld 5 fails (see FIG. 3 showing spot weld failure). Alternatively, both second legs 12, 22 of the first and second L-shaped coupons can simultaneously be pulled in opposite directions in the y-axis that are perpendicular to the welded interface 30, as indicated by the two arrows in FIG. 2; or only the second leg 22 of the second L-shaped coupon 20 can be pulled in the y-axis direction that is perpendicular to the welded interface 30 (i.e. pulled down in FIG. 2) as indicated by the down arrow in FIG. 2, while the second leg 12 of the first L-shaped coupon 10 may be held stationary.

The pulling force F applied to the test coupon 1 is measured during the entire coach peel test. The force F applied to the test coupon 1 normally progressively increases during the coach peel test, and reaches its peak value immediately before the spot weld 5 fails. Failure of the spot weld 5 occurs for example, by the spot weld 5 pulling out of one or both of the L-shaped coupons as a weld nugget, or by the spot weld 5 experiencing interfacial cracking as shown for example, in FIG. 3. At this point, the spot weld 5 is considered to have failed, but may still partially connect the two L-shaped coupons, but will not carry any more load.

In several embodiments, the test coupon 1, before the coach peel test, can have a height H of 190-210 mm, or 200 mm±0.5 mm; a width W of 20-30 mm, or 25 mm±0.5 mm; a bend radius R of 3-7 mm, or 5 mm±0.5 mm at a bend between the first leg 11, 21 and second leg 12, 22 on each of the respective first and second L-shaped coupons; a welded interface 30 that is centrally located (±0.5 mm) between the distal ends 13, 23 of the respective first and second L-shaped coupons; an extent E of 7-13 mm, or 10 mm±0.5 mm between the center of the spot weld 5 and the outer surfaces 14, 24 of the respective second legs 12, 22 of the two L-shaped coupons, or combinations thereof.

During the coach peel test in several embodiments, up to 20-30 mm, or 25 mm±0.5 mm of each of the distal ends 13, 23 of the two L-shaped coupons 10, 20 can be hydraulically gripped by a testing apparatus, and the first and second L-shaped coupons can be peeled away from each other in the y-axis direction at a velocity of 0.01 to 1 mm/sec.

In accordance with the present subject matter, the value for d used in Formula I, is the bending moment arm length at peak force $d_p$. In order to determine the bending moment arm length at peak force $d_p$, DIC is used to continually monitor the test coupon 1 during the coach peel test. Digital image correlation employs tracking of optical markers, which are established relative to particular points on the test coupon 1, and employs optical image registration to provide accurate measurements of any movement of the optical markers determined by changes in the location of the markers.

During the coach peel test and as shown between FIGS. 2 and 3, the first and second L-shaped coupons 10, 20 are pulled apart in the y-axis direction, and bend or deflect from their original cross-sectional shape (FIG. 2) and deform to a different cross-sectional shape (FIG. 3). In this process, the front edge 6 of the spot weld 5 moves to the left in the figures (herein referred to as "the x-axis direction," which is perpendicular to the y-axis direction) and as can be seen, the front edge 6 gets closer to the clamped distal ends 13, 23 of the first and second L-shaped coupons 10, 20. Accordingly, the bending moment arm length for the spot weld 5 changes and becomes shorter during the coach peel test.

In several embodiments, movement of the L-shaped coupons 10, 20 are tracked by DIC during the entire coach peel test, for example by measuring certain optical markers or points established relative to the test coupon. Optical markers may be established relative to positions on the test coupon 1 at a time before the coach peel test is commenced. These markers are then tracked and measured continuously throughout the coach peel test, and movement of the markers during the coach peel test indicates corresponding movement of the test coupon.

The optical markers that are tracked by DIC may include a marker at a center of the spot weld 5, a marker at a front edge 6 of the spot weld 5, a marker on one or both of the outer surfaces 14, 24 of the respective first and second L-shaped coupons, or combinations thereof. Various other markers can be established as desired for a particular assessment of the test coupon 1.

The bending moment arm length at peak force $d_p$ can be calculated using measurements determined using DIC input into the following Formula III.

$$d_p = d_i - T - D_e \quad \text{Formula III:}$$

In the above Formula III and with reference to the figures, $d_i$ is the initial length of the bending moment arm at a time before the coach peel test is performed (FIG. 2). The initial bending moment arm length $d_i$ is the distance between an initial position Pi of a front edge 6 of the spot weld 5 that is closest to the second legs 12, 22 of the first and second L-shaped coupons, and a line 40 extending between markers 15, 25 on the outer surfaces 14, 24 of the first and second L-shaped coupons, respectively.

In Formula III, T is the thickness of the first L-shaped coupon 10, the thickness of the second L-shaped coupon 20, or the thickness of each of the first and second L-shaped coupons. $D_e$ (FIG. 3) is the displacement in the x-axis direction experienced by the front edge 6 of the spot weld 5 during the coach peel test. That is, the displacement $D_e$ is the distance in the x-axis direction measured using DIC, between the initial position Pi of marker 7 at the front edge 6 of the spot weld 5, and a final position Pf of marker 7 at the time the force F reached its peak value. The displacement $D_e$ of marker 7 thus indicates how far the front edge 6 of the spot weld 5 moved in the x-axis direction from the start of the coach peel test to the time when the force F reaches its peak. As will be appreciated, such displacement $D_e$ is usually towards the clamped distal ends 13, 23 of the two L-shaped coupons 10, 20.

The measurements needed to determine the variables used in Formula III are made using DIC, wherein in several embodiments optical markers 7, 15, and 25 are tracked during the coach peel test. The calculations of Formula III can be performed by an automated system, for example by a calculation unit associated with the DIC unit itself.

In an alternative embodiment, rather than making calculations using Formula III to determine the bending moment arm length at peak force $d_p$, the bending moment arm length may be directly measured using DIC tracking of optical markers 7, 15, and 25. In this embodiment, the position of markers 15, 25 on the outer surfaces 14, 24 may be chosen such that they remain in a fixed relative position in the x-axis direction with respect to the clamped distal ends 13, 23 of the first and second L-shaped coupons 10, 20 during the coach peel test. This may allow for the bending moment arm length at peak force to be directly measured using DIC by using the distance between marker 7 and a line 40 extending between markers 15 and 25 at the time the force F reaches is maximum. In other words, at the point in time when the force F reaches its maximum during the coach peel test, it is at this time that the bending moment arm length at peak force $d_p$ can be directly measured using DIC.

However determined, the bending moment arm length at peak force $d_p$ is multiplied by the measured maximum force F applied to the test coupon 1 during the coach peel test, to thereby calculate an accurate maximum bending moment Mb for the spot weld.

As will be appreciated, since the front edge 6 of the spot weld 5 moves in the x-axis direction during the coach peel test to be closer to the clamped distal ends 13, 23 of the first and second L-shaped coupons 10, 20 (e.g. closer to the line 40 extending between markers 15 and 25), the bending moment arm length of the test coupon 1 gets shorter as the coach peel test proceeds. That is, $d_p$ is shorter than $d_i$. Applicant has found that this instantaneous value of $d_p$, which is taken at the time when the force F reaches its peak value and which is shorter than an initial bending moment arm length $d_i$ of the test coupon 1, allows for the most accurate determination of the maximum bending moment Mb for a spot weld. Other values of the bending moment arm length, such as the longer initial bending moment arm length, have been found to not provide accurate estimations of the actual value of the maximum bending moment Mb for a spot weld, and may lead to design flaws in spot welding of a vehicle frame.

The accurate maximum bending moment Mb determined by the present methods can then be input into a material card in CAE simulations and used as part of a calculation (i.e. Formula II) to determine the combination of different types of forces that would result in spot weld failure, under both static and dynamic loading.

As a result of using the instant methods, the maximum bending moment Mb is easily determined using a single coach peel test and does not require an iterative process as is conventionally employed for matching measured force values to simulated force values for arriving at a maximum bending moment Mb.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for obtaining a maximum bending moment for a spot weld, comprising:
   (a) providing a test coupon including the spot weld;
   (b) subjecting the test coupon to a coach peel test, wherein a length of a moment arm for the test coupon changes during the coach peel test;
   (c) using digital image correlation to determine a bending moment arm length for the test coupon, wherein the bending moment arm length is the length of the moment arm at a time when a peak force is applied to the test coupon during the coach peel test, and is shorter than the length of the moment arm at a time before the test coupon is subjected to the coach peel test; and
   (d) multiplying the bending moment arm length by the peak force to thereby calculate the maximum bending moment for the spot weld.

2. The method according to claim 1, wherein:
   the test coupon includes a first L-shaped coupon and a second L-shaped coupon,
   each of the first L-shaped coupon and the second L-shaped coupon include a first leg and a second leg,
   the first leg of the first L-shaped coupon is attached by the spot weld to the first leg of the second L-shaped coupon, and
   the second leg of the first L-shaped coupon is co-planar with the second leg of the second L-shaped coupon.

3. The method according to claim 2, wherein step (b) includes applying a progressively increasing force to the second leg of at least one of the first L-shaped coupon and the second L-shaped coupon to peel the first L-shaped coupon and the second L-shaped coupon away from each other and eventually cause failure of the spot weld.

4. The method according to claim 3, wherein the bending moment arm length for the test coupon at the time the peak force is applied to the test coupon is determined using the following formula:

$$dp = di - T - De$$

wherein dp is the bending moment arm length for the test coupon at the time the peak force is applied to the test coupon,
   wherein di is the length of the moment arm at the time before the test coupon is subjected to the coach peel test,
   wherein T is a thickness of the first L-shaped coupon or is a thickness of the second L-shaped coupon, and
   wherein De is a displacement experienced by an edge of the spot weld that is closest to the second legs of the first L-shaped coupon and the second L-shaped coupon.

5. The method according to claim 4, wherein:
   each of the second leg of the first L-shaped coupon and the second leg of the second L-shaped coupon have an outer surface facing away from the spot weld,
   step (b) includes:
      establishing optical markers relative to the test coupon before the test coupon is subjected to the coach peel test, and
      tracking a position of the optical markers during the coach peel test using the digital image correlation, and
   the optical markers include:
      a first marker associated with the outer surface of the second leg of the first L-shaped coupon,
      a second marker associated with the outer surface of the second leg of the second L-shaped coupon, and
      a third marker associated with the edge of the spot weld that is closest to the first marker and the second marker.

6. The method according to claim 5, wherein $d_i$ is measured between the third marker and a line extending from the first marker to the second marker.

7. The method according to claim 5, wherein De is a distance between an initial position of the third marker before the test coupon is subjected to the coach peel test and a final position of the third marker when the peak force is applied.

8. The method according to claim 5, wherein the first L-shaped coupon and the second L-shaped coupon are peeled away from each other during the coach peel test at a velocity of 0.01 to 1 mm/sec.

9. The method according to claim 5, wherein the progressively increasing force is applied to the second leg of the first L-shaped coupon, and the second leg of the second L-shaped coupon is held stationary.

10. A method of estimating a strength of a spot weld under a combined loading condition, the method including determining a shear force limit, a bending moment limit, a normal force limit, and a torsion moment limit of the spot weld, wherein the bending moment limit is determined by:
    (a) providing a test coupon including a first L-shaped coupon and a second L-shaped coupon each of the first L-shaped coupon and the second L-shaped coupon including a first leg and a second leg, wherein the first leg of the first L-shaped coupon is attached by the spot weld to the first leg of the second L-shaped coupon, and wherein the second leg of the first L-shaped coupon is co-planar with the second leg of the second L-shaped coupon;
    (b) subjecting the test coupon to a coach peel test, wherein a length of a moment arm for the test coupon changes during the coach peel test;
    (c) using digital image correlation to determine a bending moment arm length for the test coupon, wherein the bending moment arm length is the length of the moment arm at a time when a peak force is applied to the test coupon during the coach peel test, and is shorter than the length of the moment arm at a time before the test coupon is subjected to the coach peel test; and
    (d) multiplying the bending moment arm length by the peak force to thereby calculate the bending moment limit for the spot weld.

11. The method according to claim 10, wherein the bending moment arm length for the test coupon at the time the peak force is applied to the test coupon is determined using the following formula:

$$dp = di - T - De$$

wherein dp is the bending moment arm length for the test coupon at the time the peak force is applied to the test coupon,
    wherein di is the length of the moment arm at the time before the test coupon is subjected to the coach peel test,
    wherein T is a thickness of the first L-shaped coupon or is a thickness of the second L-shaped coupon, and
    wherein De is a displacement experienced by an edge of the spot weld that is closest to the second legs of the first L-shaped coupon and the second L-shaped coupon.

12. The method according to claim 11, wherein:
    each of the second leg of the first L-shaped coupon and the second leg of the second L-shaped coupon have an outer surface facing away from the spot weld, step (b) includes:
  establishing optical markers relative to the test coupon before the test coupon is subjected to the coach peel test, and
  tracking a position of the optical markers during the coach peel test using the digital image correlation, and
the optical markers include:
  a first marker associated with the outer surface of the second leg of the first L-shaped coupon,
  a second marker associated with the outer surface of the second leg of the second L-shaped coupon, and
  a third marker associated with the edge of the spot weld that is closest to the first marker and the second marker.

13. The method according to claim 12, wherein $d_i$ is measured between the third marker and a line extending from the first marker to the second marker.

14. The method according to claim 12, wherein De is a distance between an initial position of the third marker before the test coupon is subjected to the coach peel test and a final position of the third marker when the peak force is applied.

15. A method of predicting a failure of a spot weld that is subjected to a combined loading condition, the method including:
  (I) determining a shear force limit, a bending moment limit, a normal force limit, and a torsion moment limit of the spot weld, wherein the bending moment limit is determined by:
    (a) providing a test coupon including a first L-shaped coupon and a second L-shaped coupon each of the first L-shaped coupon and the second L-shaped coupon including a first leg and a second leg, wherein the first leg of the first L-shaped coupon is attached by the spot weld to the first leg of the second L-shaped coupon, and wherein the second leg of the first L-shaped coupon is co-planar with the second leg of the second L-shaped coupon;
    (b) subjecting the test coupon to a coach peel test, wherein a length of a moment arm for the test coupon changes during the coach peel test;
    (c) using digital image correlation to determine a bending moment arm length for the test coupon, wherein the bending moment arm length is the length of the moment arm at a time when a peak force is applied to the test coupon during the coach peel test, and is shorter than the length of the moment arm at a time before the test coupon is subjected to the coach peel test; and
    (d) multiplying the bending moment arm length by the peak force to thereby calculate the bending moment limit for the spot weld,
  (II) simulating a combined loading condition on the spot weld using a spot weld failure model represented by the formula:

$$\left(\frac{fs}{Fs}\right)^\alpha + \left(\frac{mb}{Mb}\right)^\gamma + \left(\frac{fn}{Fn}\right)^\mu + \left(\frac{mt}{Mt}\right)^\beta = 1$$

wherein Fs is the shear force limit, Mb is the bending moment limit, Fn is the normal force limit, and Mt is the torsion moment limit for the spot weld, wherein fs is a shear force, mb is a bending moment, fn is a normal force, and mt is a torsion moment applied to the spot weld, and wherein α, γ, μ, and β are shape parameters of the spot weld, and
  (III) based on results from step (II), predicting whether or not the combined loading condition will cause the spot weld to fail.

16. The method according to claim 15, wherein the bending moment arm length for the test coupon at the time the peak force is applied to the test coupon is determined using the following formula:

$$dp = di - T - De$$

wherein dp is the bending moment arm length for the test coupon at the time the peak force is applied to the test coupon,
  wherein di is the length of the moment arm at the time before the test coupon is subjected to the coach peel test,
  wherein T is a thickness of the first L-shaped coupon or is a thickness of the second L-shaped coupon, and
  wherein De is a displacement experienced by an edge of the spot weld that is closest to the second legs of the first L-shaped coupon and the second L-shaped coupon, and
  wherein dp and di are determined with respect to the edge of the spot weld that is closest to the second legs of the first L-shaped coupon and the second L-shaped coupon.

17. The method according to claim 16, wherein:
each of the second leg of the first L-shaped coupon and the second leg of the second L-shaped coupon have an outer surface facing away from the spot weld,
step (b) includes:
  establishing optical markers relative to the test coupon before the test coupon is subjected to the coach peel test, and
  tracking a position of the optical markers during the coach peel test using the digital image correlation, and
the optical markers include:
  a first marker associated with the outer surface of the second leg of the first L-shaped coupon,
  a second marker associated with the outer surface of the second leg of the second L-shaped coupon, and
  a third marker associated with the edge of the spot weld that is closest to the first marker and the second marker.

18. The method according to claim 17, wherein $d_i$ is measured between the third marker and a line extending from the first marker to the second marker.

19. The method according to claim 17, wherein De is a distance between an initial position of the third marker before the test coupon is subjected to the coach peel test and a final position of the third marker when the peak force is applied.

* * * * *